Jan. 17, 1933.   F. MAGIDSON   1,894,880
AUTOMATIC MACHINE FOR MAKING MARKING TAG CLIPS
Filed Oct. 10, 1931.   9 Sheets-Sheet 2

INVENTOR
Frank Magidson
By Green & McCallister
His Attorneys

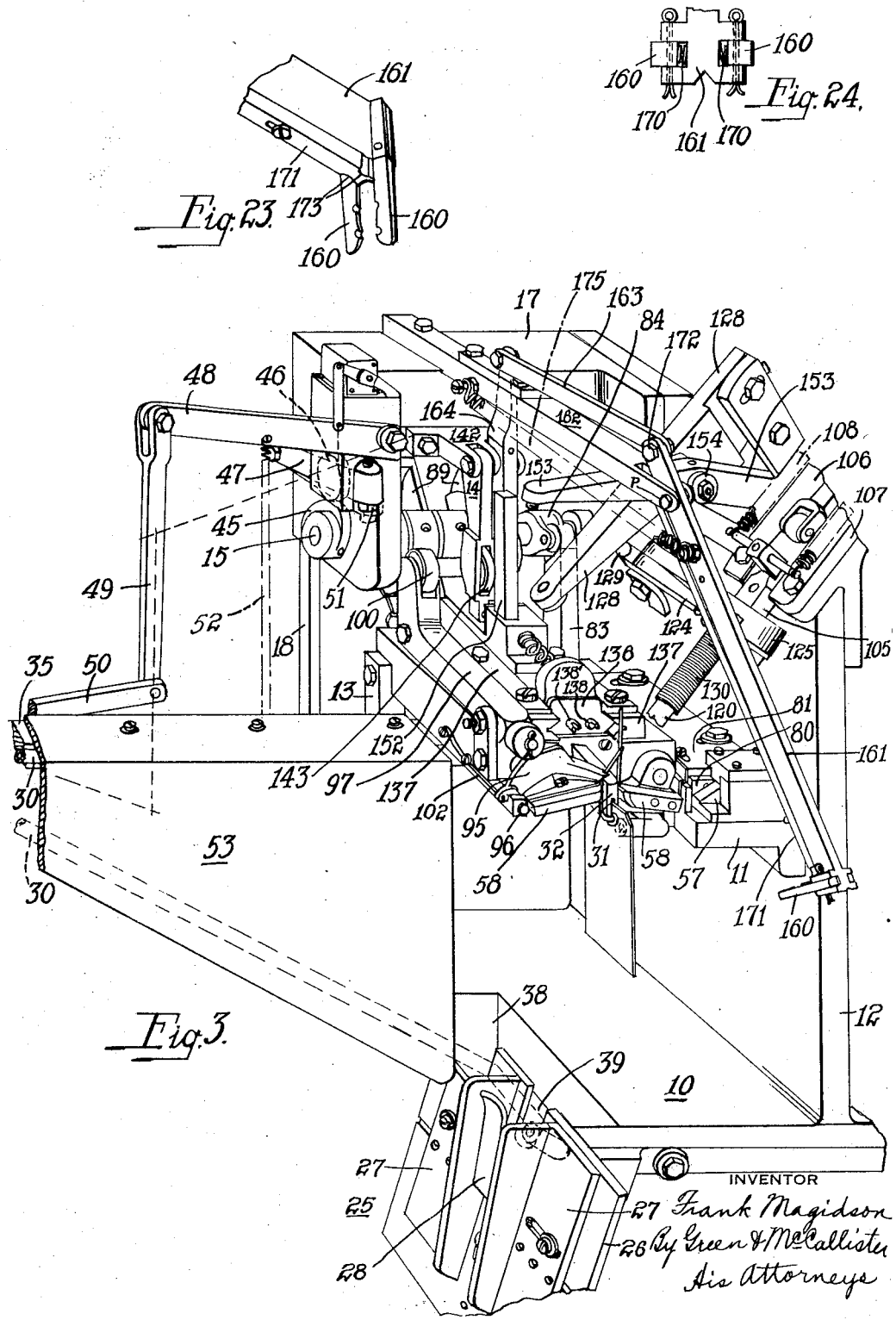

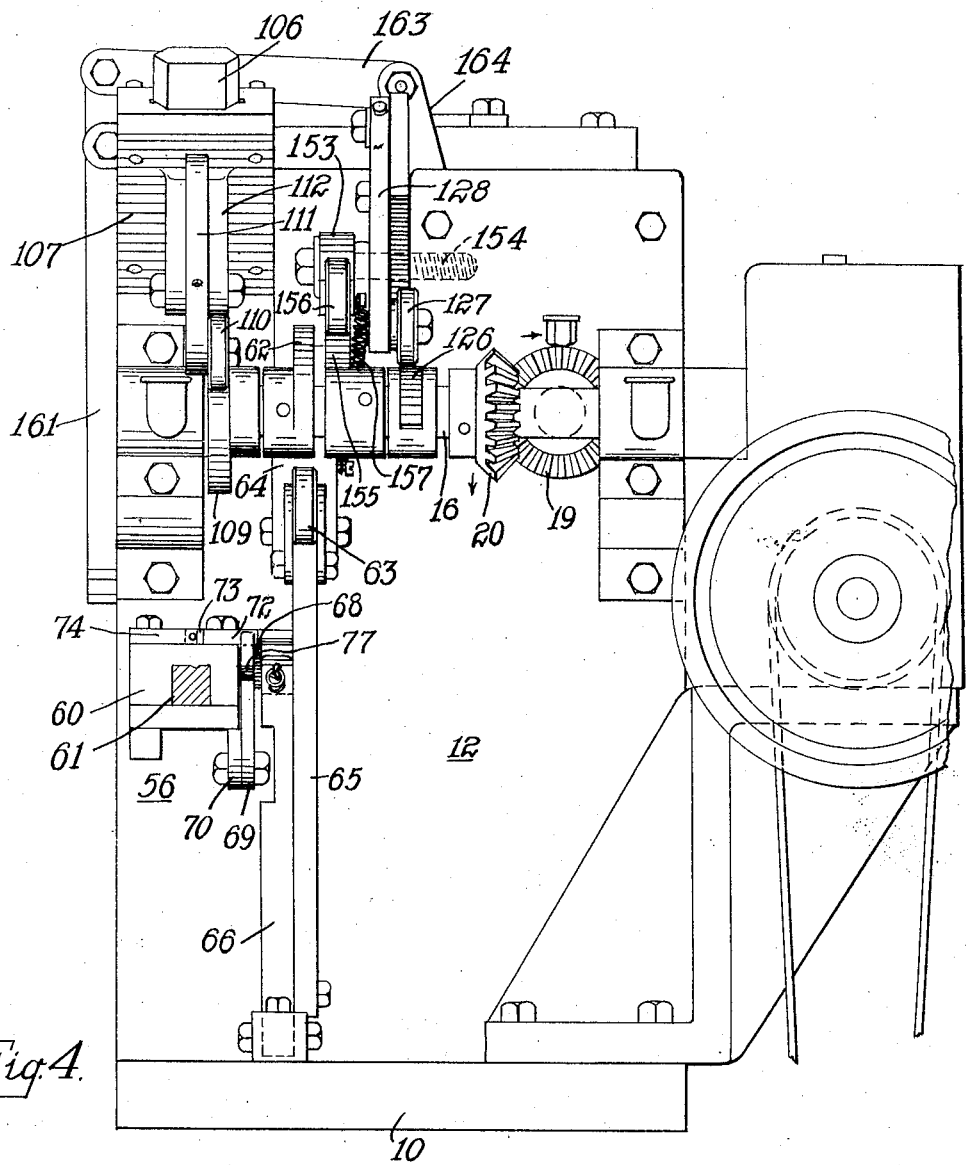
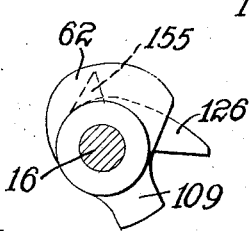

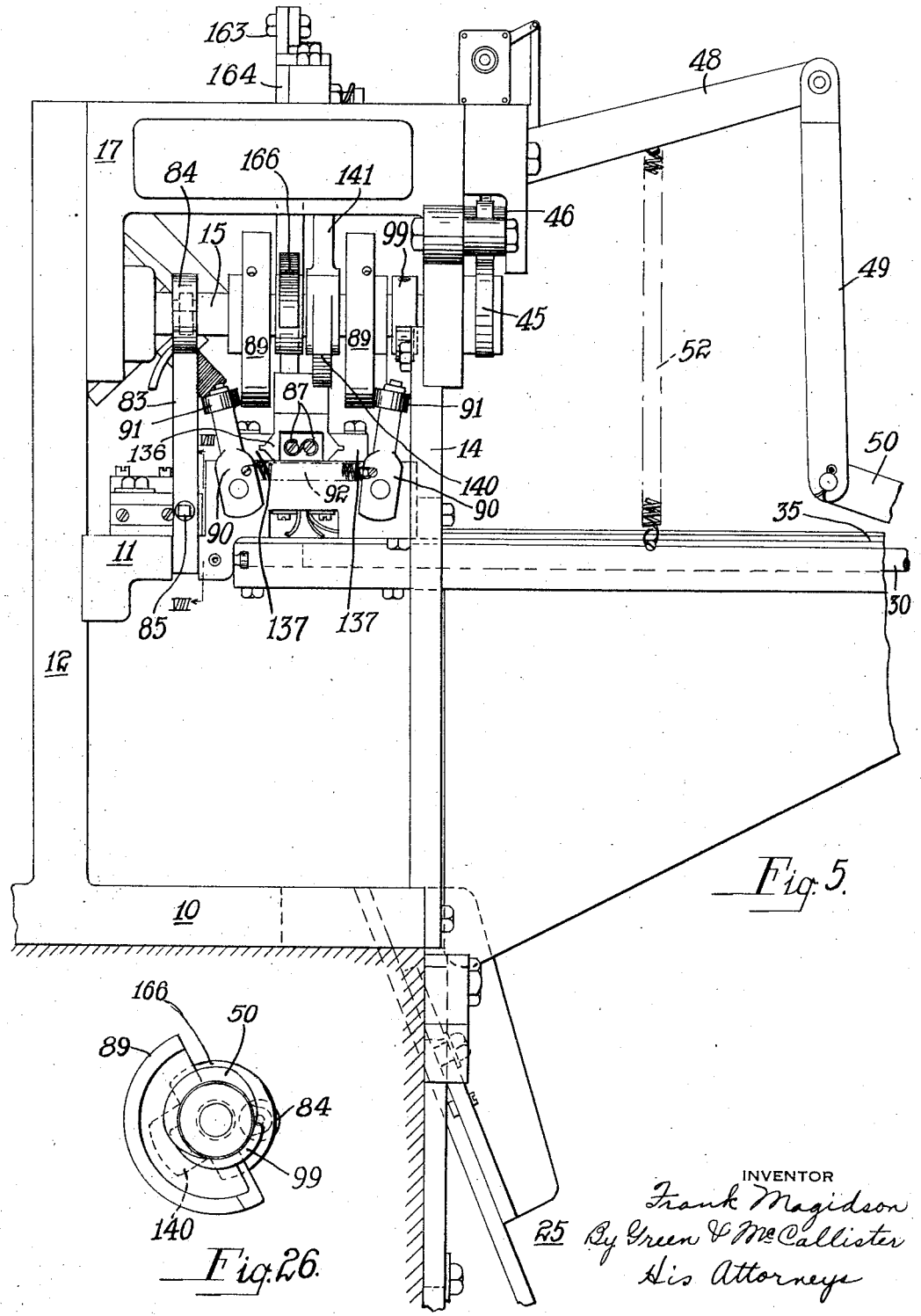

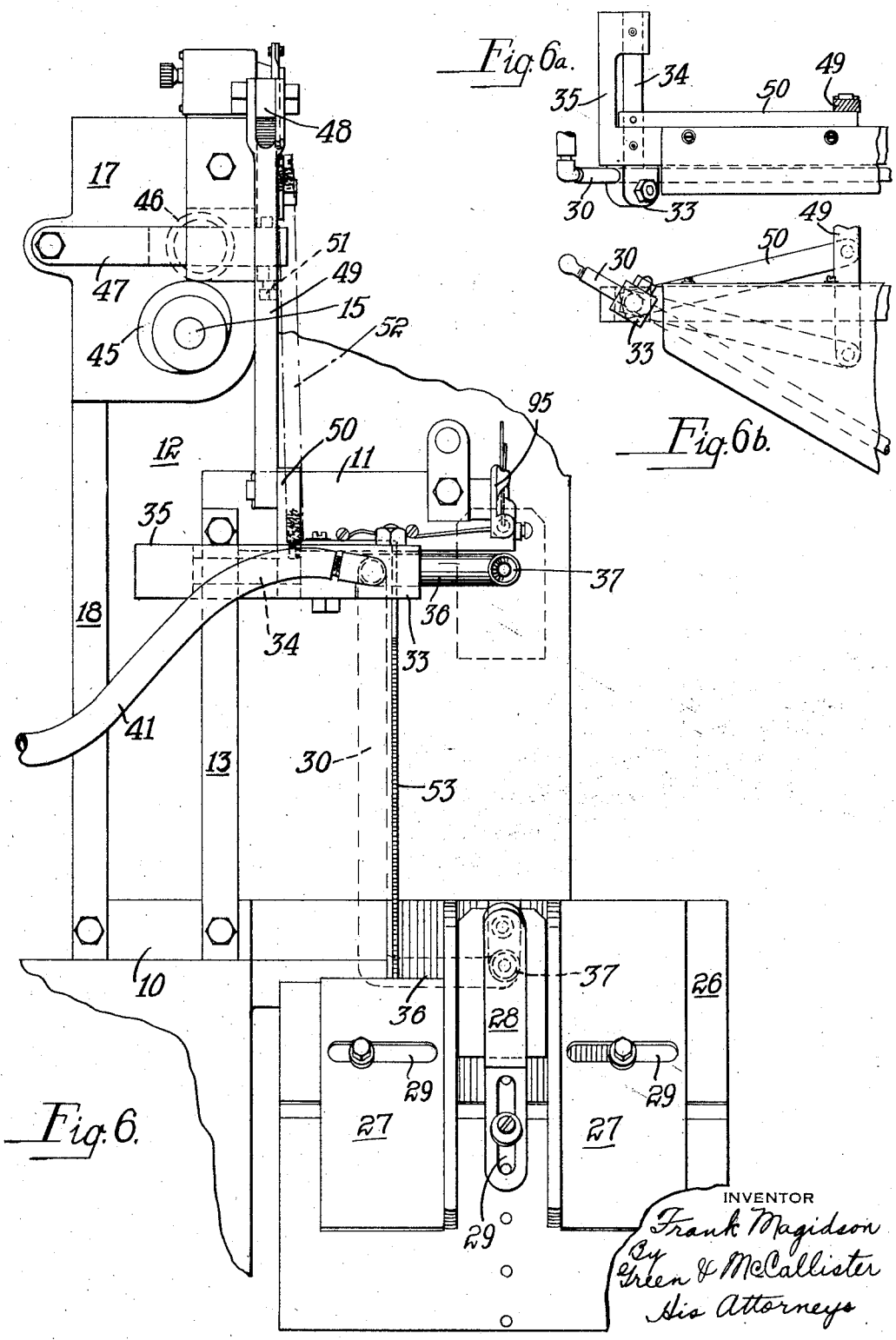

Jan. 17, 1933.   F. MAGIDSON   1,894,880
AUTOMATIC MACHINE FOR MAKING MARKING TAG CLIPS
Filed Oct. 10, 1931   9 Sheets-Sheet 7

INVENTOR
Frank Magidson
By Green & McCallister
His Attorneys

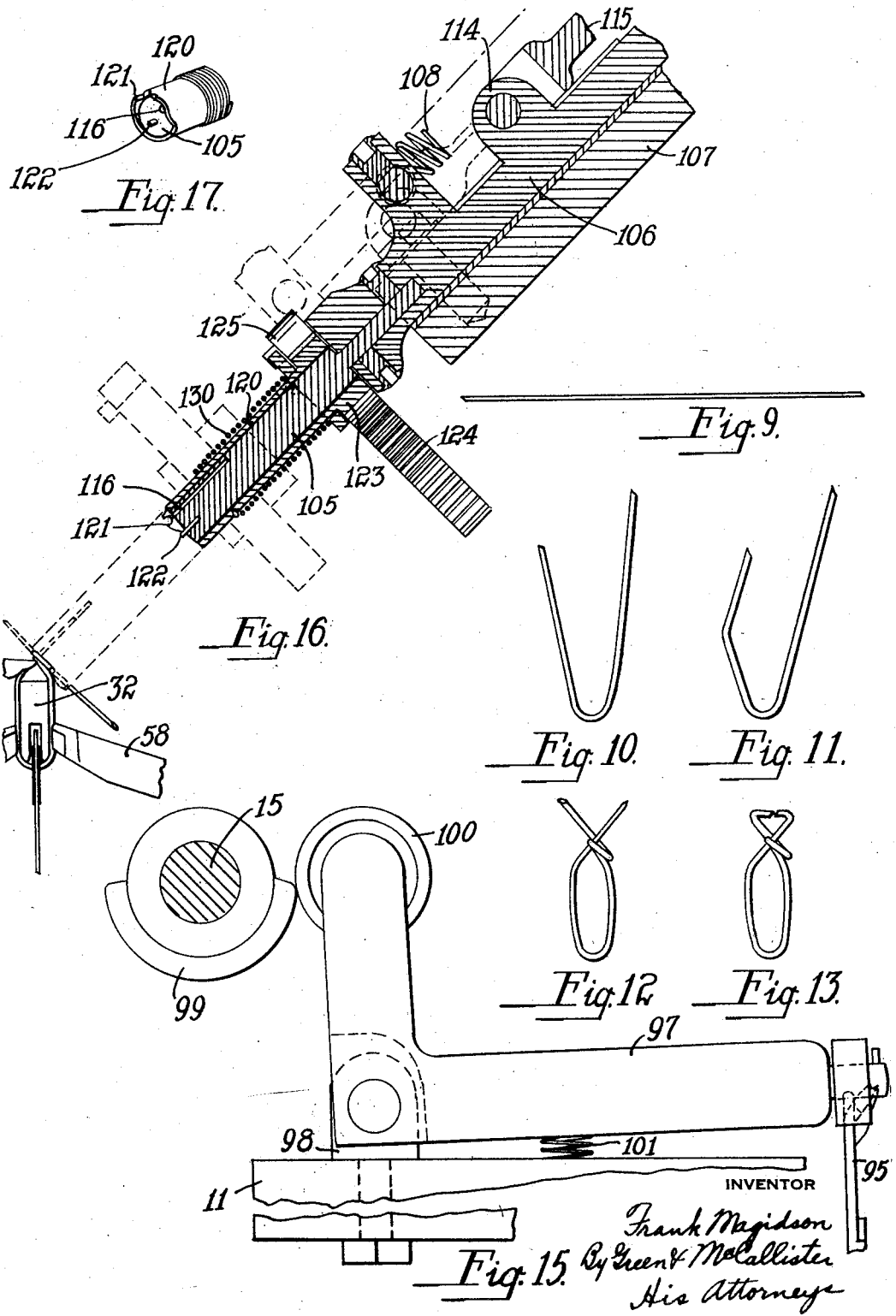

Jan. 17, 1933.  F. MAGIDSON  1,894,880
AUTOMATIC MACHINE FOR MAKING MARKING TAG CLIPS
Filed Oct. 10, 1931   9 Sheets-Sheet 9
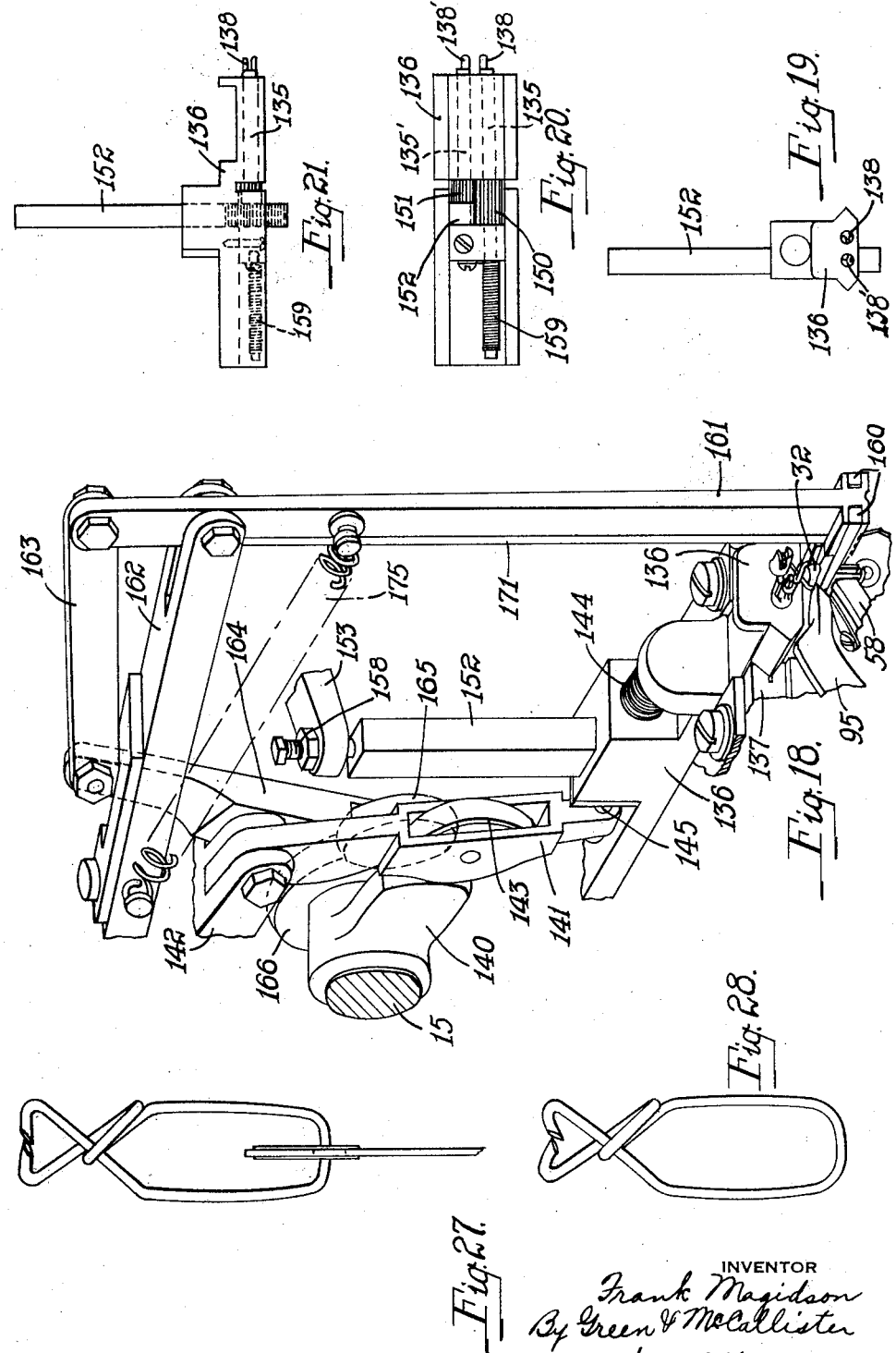
INVENTOR
Frank Magidson
By Green & McCallister
His Attorneys Patented Jan. 17, 1933

1,894,880

UNITED STATES PATENT OFFICE

FRANK MAGIDSON, OF PITTSBURGH, PENNSYLVANIA, ASSIGNOR TO PITTSBURGH TAG COMPANY, OF PITTSBURGH, PENNSYLVANIA, A CORPORATION OF PENNSYLVANIA

AUTOMATIC MACHINE FOR MAKING MARKING TAG CLIPS

Application filed October 10, 1931. Serial No. 568,191.

This invention relates to fasteners or clips for marking tags (called by the Patent Office pin tickets), and more particularly, to machines for automatically forming in place so to speak on a tag, wire fasteners or clips such as disclosed in United States Letters Patent No. 1,769,885 issued to me on July 1, 1930.

In other words, this invention relates to automatic machines for taking wire from a reel or other source, inserting the same through the eye of a marking tag, severing the wire into certain lengths and bending the same into the desired form; such form preferably being that shown in my said patent.

An object of this invention is the production of a machine which will take wire from a reel or other source, straighten the same, cut the same into definite lengths, insert the same through a tag or other marking device and bend the same into the form of a fastener or clip preferably as shown in my said patent.

A further object is the production of a fastener or clip-making machine, having means for feeding tags or tickets to the machine in timed relation to the mechanism for inserting therethrough the wire from which the fasteners or clips are formed.

A still further object of the invention is to produce a tag or ticket hopper into which the tags or tickets (to be equipped with fasteners or clips) are placed, and mechanism for receiving said tags or tickets, one by one, and carrying them to that point in the machine where the fastener or clip-forming machine performs the function of inserting and bending to shape the wire forming the fastener or clip.

These, as well as other objects which will readily appear to those skilled in this particular art, I attain by means of the device described in the specification and illustrated in the drawings accompanying the same, wherein;

Fig. 3 is a view in perspective looking toward a front corner of the machine having portions thereof broken away for convenience of illustration and showing the parts in the same position as shown in Figures 1 and 2;

Fig. 4 is a view in elevation of the back of the machine showing the position of the parts as the clips are being discharged from the machine;

Fig. 5 is a view in elevation looking toward the left side of the machine showing the position of the parts when one leg of the wire is about to be bent across the other;

Fig. 6 is an enlarged view in elevation of a part of the machine looking to the front and illustrating the tag feeding mechanism;

Figs. 6A and 6B are detail views showing the mounting of the tag feeding mechanism on the frame of the machine;

Fig. 7 is an enlarged top plan view of the wire feeding mechanism;

Fig. 9 is a view in perspective of a length of wire used in making one clip;

Fig. 10 is a view i perspective, showing the shape of the wire after the first bending operation;

Fig. 11 is a view in perspective of the wire after the second bending operation;

Fig. 12 is a view in perspective of the wire after the looping operation;

Fig. 13 is a view of the wire after the jaw shaping operation and shows a completed clip;

Fig. 15 is an enlarged view in elevation of the mechanism for bending the wire into the shape shown in Figure 11;

Fig. 16 is an enlarged sectional view of the wire looping mechanism, which bends the wire to the shape disclosed in Figure 12;

Fig. 17 is an enlarged perspective view showing the end construction of the plunger rod and wire looping sleeve;

Fig. 18 is an enlarged view in perspective of the jaw shaping mechanism and discharge mechanism, the jaw shaping mechanism bends the wire into the position shown in Figure 13;

Fig. 19 is a view in front elevation of the jaw shaping mechanism;

Fig. 20 is a top plan view of the jaw shaping mechanism;

Fig. 21 is a view in side elevation of the jaw shaping mechanism;

Fig. 23 is an enlarged view in perspective of the discharge mechanism;

Fig. 24 is an enlarged view of the discharge mechanism showing the mounting of the plier arms in detail;

Fig. 25 is an enlarged end view of the cam shaft showing the cams for operating the wire feeder, the plunger loop twister, and the plunger guide;

Fig. 26 is an end view of the cam shaft showing the cams for operating the tag feeding mechanism, the wire cutter, wire bending mechanisms and the discharge mechanism;

Fig. 27 is an enlarged view in perspective of the fastener formed on a tag, and

Fig. 28 is an enlarged view of a modified form of fastener.

Generally the machine consists of a wire feeding mechanism which pulls the wire from a reel and forces or pushes the same into position in the machine. After leaving the reel, the wire is drawn through straightening rolls by the wire puller and is directed past a cutter into grooved guiding arms which thread the wire through a tag which has been delivered to the machine by a tag feeding mechanism. The tag as it is delivered to the machine, is positioned in a stationary mandrel about which the fastener is formed or shaped. The wire in its passage into the machine moves through the tag below the mandrel and when the proper length of wire has been forced into the machine the wire is severed. At the time the wire is severed it projects a greater distance on one side of the mandrel than on the other.

As soon as the wire is severed, the ends of the wire on opposite sides of the mandrel are bent upwardly around the mandrel by means of the guiding arms. The ends of the guiding arms are channeled and hold the ends of the wire firmly against the sides of the mandrel. As the wire is held in this position a cam operated finger is brought into engagement with the shorter end of the wire and bends the same across the top of the mandrel so that it intersects the other leg of the wire. As the wire is held against the mandrel by the guiding arms and the bending finger, the long end of the wire is acted upon by a plunger and twisting mechanism which bends it across the top of the mandrel and loops it around the short end of the wire.

After the loop has been formed the plunger and twisting mechanisms are returned to their initial positions, leaving the ends of the wire above the loop projecting in opposite directions. While the wire is still held against the mandrel by the guiding arms and wire bending finger, jaw shaping mechanism is moved into its operative position and the ends of the wire are received in notched shafts which are turned in opposite directions and bend the ends of the wire back toward each other so as to form the article engaging jaws on the clip or fastener.

After the jaws have been formed the jaw shaping mechanism is returned to its inoperative position and the guiding arms and wire bending finger are withdrawn from their wire holding position. The fastener is then grabbed by the pliers of the discharge mechanism which swings away from the mandrel and drops the tag with its fastener or clip into a receiving receptacle.

As the discharge mechanism swings away from the mandrel, another tag is fed thereto and another piece of wire is forced into the machine and this cycle repeated. All of the various mechanisms are operated by cams in timed relation to each other and in the order named.

*The machine in detail*

Figure 1:
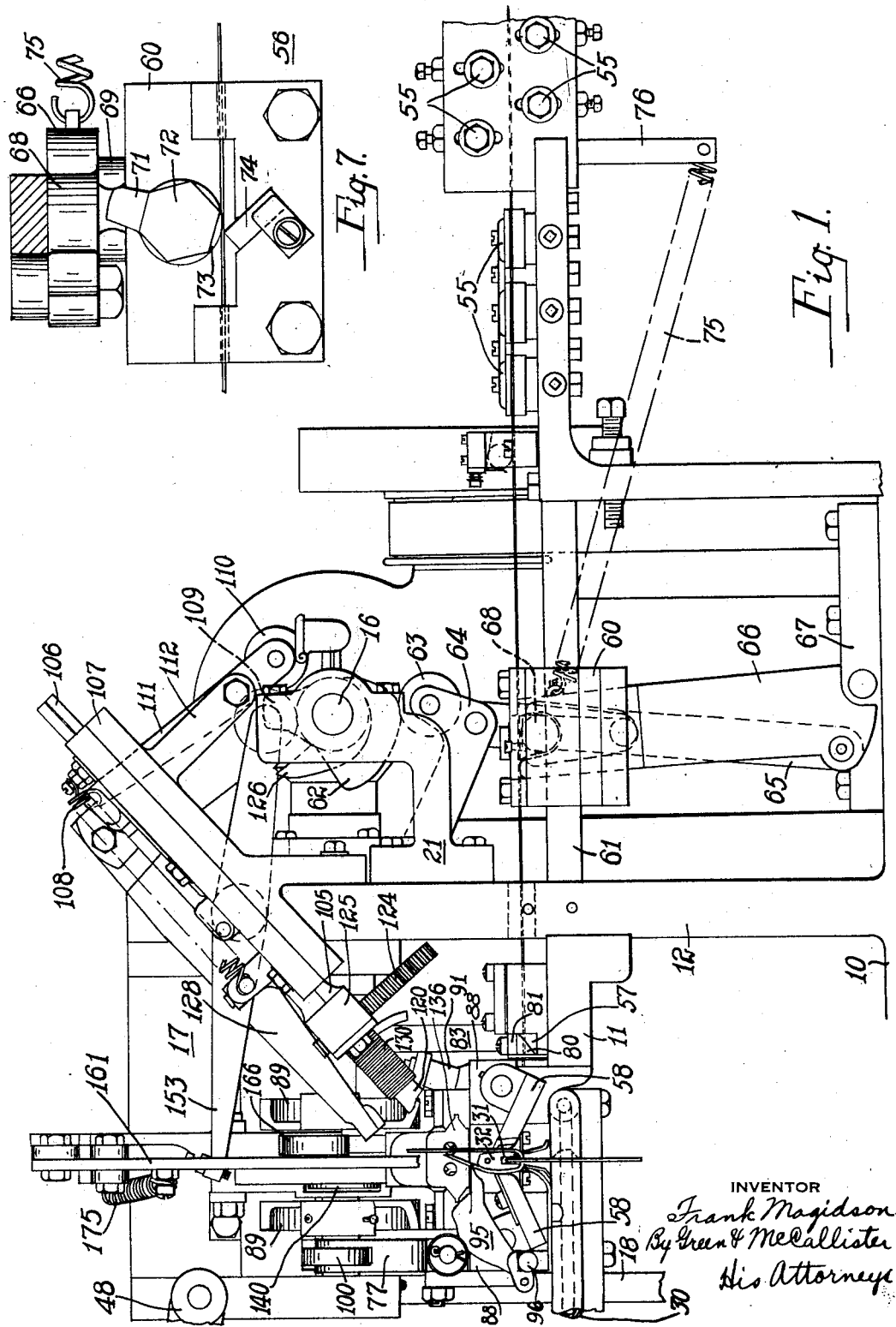
Figure 1 is a view in side elevation of a machine embodying the invention and having portions thereof broken away for convenience of illustration and showing the position of the various parts when one leg of the fastener is about to be bent across the other leg.

The machine is provided with a horizontal bed plate 10 supported on a suitable standard (not shown). The wire cutter, the wire guides, the stationary forming mandrel, the wire bending finger and the jaw shaping mechanism are all located above the bed plate 10 on a shelf 11 which is bolted to an upright 12, while the wire bending plunger and looping mechanism are supported directly on the upright 12. The shelf 11 is further supported by a suitable standard or leg 13 which is secured to the bed plate. All of the mechanisms operate in the plane of the wire in its passage into position in the machine (Figs. 1, 3, and 5).

The cams for operating the different parts of the machine in timed relation one to the other are mounted on angularly disposed shafts 15 and 16 (Figs. 1, 2, 3, 4, 5). The shaft 15 is journaled in suitable bearings in an inverted U-shaped member 17, one leg of which is bolted to the upright member 12, while the other leg is supported by a suitable standard or leg 18 extending upwardly from the bed plate 10. One end of the shaft 15 extends through the upright member 12 and has a bevel gear 19 secured thereto which meshes with a bevel gear 20 secured to the shaft 16. The shaft 16 is journaled in suitable bearings in brackets 21 which are bolted to the upright member 12 and is driven by a motor (not shown) through suitable gearing (not shown).

Tag holder and tag feeding mechanism

The tags to be fed into the machine are placed in an adjustable holder or hopper 25 (Fig. 3) which is secured to the edge of the bed plate 10. The holder comprises a base plate 26 on which members 27 having their adjacent edges flanged outwardly to form the side walls of the holder and a tongue 28 having an offset therein forming the bottom of the holder, are mounted. The flanged members 27 and the tongue 28 are each provided with a slot 29 through which fastening bolts extend for securing the members to the base plate 26. This slotted arrangement permits the members 27 and the tongue 28 to be adjusted so that tags of various sizes may be positioned in the holder.

Figure 2:
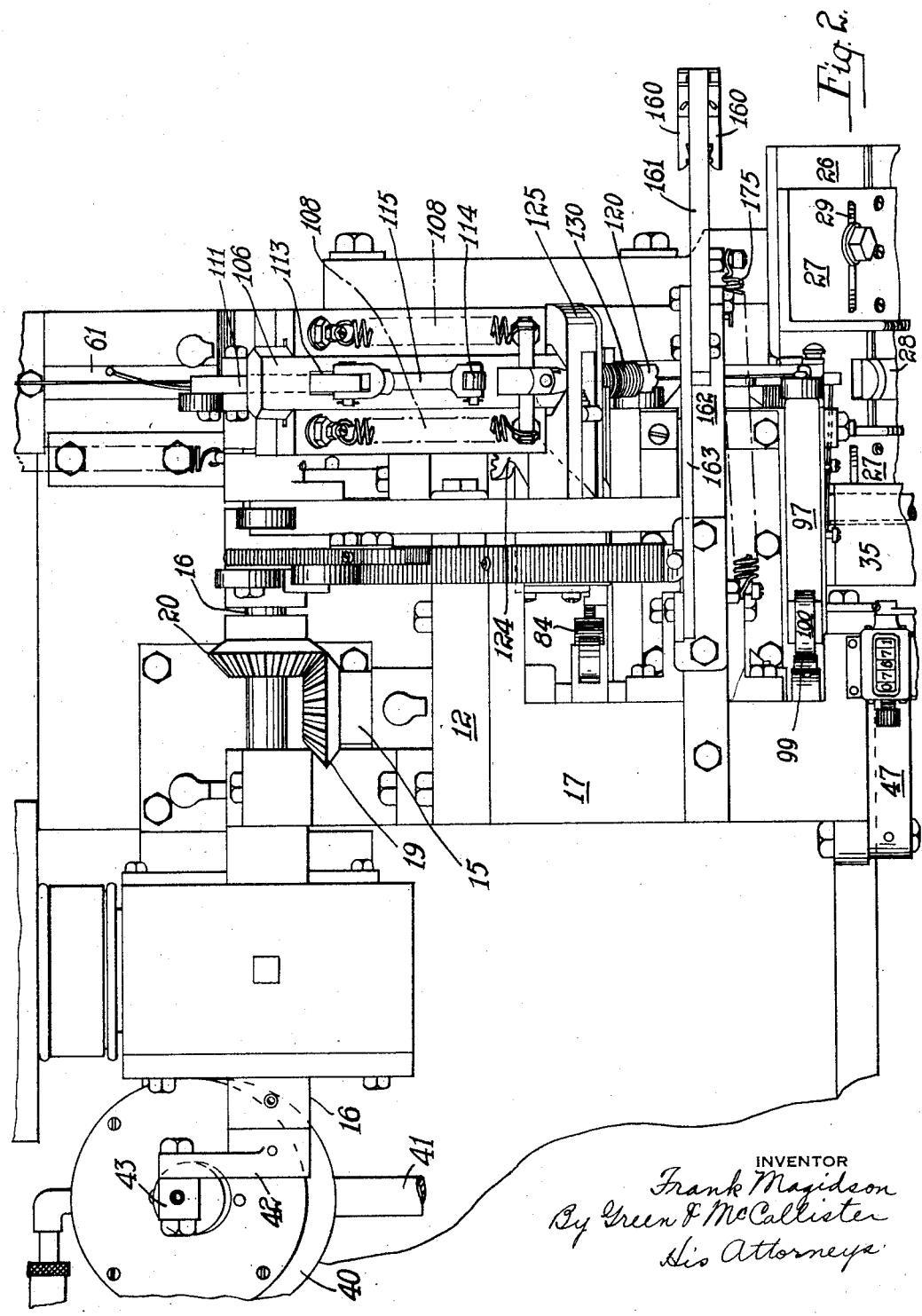
Fig. 2 is a top plan view looking toward the front of the machine; portions thereof are broken away and the parts are shown in the same position as disclosed in Figure 1.
Figure 22:
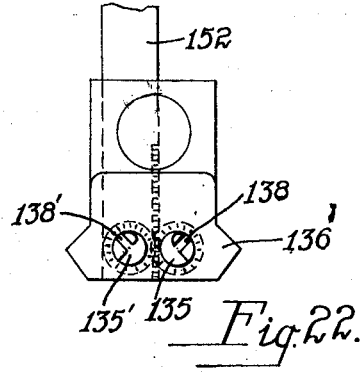
Fig. 22 is an enlarged front elevation of the jaw shaping mechanism having a portion of the actuating rod broken away.

The tags are fed one at a time from the holder 25 and positioned in a groove 31 formed in a stationary receiving mandrel 32. (Figs. 1, 3, 5, 6, 6A and 6B). The mechanism for delivering the tags from the holder to the mandrel comprises a hollow suction arm 30 one end of which extends through a block 33 secured to the end of a shaft 34 journaled in a frame member 35 which is bolted to the shelf 11. The opposite end 36 of the arm 30 is substantially of U-shape and has a short leg 37 which carries the tags. The tags are fed from the back of the holder and in order to position the leg 37 in tag receiving position, the bed plate 10 is cut away as at 38, to receive the U-shaped end 36 of the arm, and the base plate 26 slotted as at 39, to receive the leg 37 which is of such length that it is flush with the inner face of the plate 26. A pump 40 having a hose 41 connecting it with the arm 30 creates a suction in the hollow arm and causes the tags to adhere to the end 37. The suction pump 40 is operated by a crank arm 42 secured to the end of the crank shaft 16 and connected to the piston rod 43 of the pump. (Fig. 2.)

The end 36 of the suction arm 30 is periodically oscillated between the tag holder 25 and the forming mandrel 32, so as to carry one tag at a time from the holder to the mandrel by mechanism operated by a cam 45 mounted on the end of the cam shaft 15. The cam 45 engages a roller 46 carried on a lever 47 which is pivoted to the frame member 17. A lever 48, which is angularly disposed to the lever 47, is pivoted to the frame and rests on the end of the lever 47. A link 49 connects the lever 48 to a lever 50 which is secured to the shaft 34 carrying the suction arm 30. (Fig. 3.)

From the above arrangement, it is obvious that, as the cam shaft 15 rotates, the cam 45 will raise the end of the lever 47 which raises the outer end of the lever 48. The lever 48 in turn raises the lever 50 through the connecting link 49 and turns the shaft 34 and the block 33 through which the arm 30 extends. The turning of the shaft 34 causes the end 37 of the suction arm 30 to swing from the holder 25 to the mandrel 32.

A set screw 51 which extends through the end of the lever 47 and engages the lever 48 provides an adjustment for regulating the height to which the end 37 of the arm may be raised. A spring member 52 forces the roller 46 to follow the contour of the cam 45.

A triangular shaped plate member 53 is secured to the frame member 35 and protects the operator from the swinging suction arm 30.

Wire feeding mechanism

The wire for supplying the machine is obtained from a coil which is supported on a reel having a vertical axis. The wire as it is pulled from the reel passes through a series of straightening rolls 55 (Fig. 1) part of which have vertical axes and part have horizontal axes. The straightening rolls are so arranged in order that the wire will be perfectly straight as it emerges therefrom.

The wire upon emerging from the straightening rolls is guided through a wire pulling device 56 (Fig. 7) which forces the wire through a drilled cutter block 57 onto guide arms 58 which direct the end of the wire through the eye in a tag which has been positioned below mandrel 32 by the suction arm 30.

The wire puller 56 (Fig. 7) comprises a block 60 which is slidably mounted on a square shaft 61. The wire to be fed into the machine passes over the block 60 which has mechanism arranged thereon to grab the wire when the block is moving in one direction only.

Mechanism is provided for periodically moving the block 60 back and forth on the shaft 61 so as to force a length of wire into the machine. This mechanism is operated by a cam 62 which is mounted on the cam shaft 16. (Figs. 1, 4, and 7.) The cam 62 engages a roller 63 carried on the end of a shaft 64 which is pivoted to the upright 12. A link 65 connects the lever 64 to the lower end of a substantially vertical lever 66 which is pivoted to a member 67 secured to the base plate 10. The upper end of the lever 66 is bifurcated and receives a roller 68 mounted on a stub shaft secured to a lever 69 which is pivoted to a bracket 70 depending from the block 60. The upper end of the lever 69 is also bifurcated and receives a projection 71 formed on a trigger 72 which is pivotally mounted on the block 60. The trigger 72 is provided with an eccentric cam surface 73 which is located adjacent the wire passing over the block.

From this arrangement it is readily apparent that as the lever 64 is forced downwardly by the cam 62, the bifurcated end of the substantially vertical lever 66 will be swung forwardly by the link 65. The lever 66 through the roller 68 moves the lever 69 about its pivot point which movement turns the trigger 72 through the projection 71 and causes the cam surface 73 to wedge the wire against the biting edge of a member 74 which is located on the block 60 on the opposite side of the wire from the trigger 72. As the trigger wedges the wire against the member 74, the block is moved toward the mandrel by the lever 66 and forces a length of wire through the drilled cutter block 57.

A spring member 75 attached to the upper end of the lever 66 and an arm 76 depending from the frame of the machine, pulls the lever 66 and lever 69 back to their original position as soon as the cam 62 releases the lever 64. The movement of the lever 69 to its initial position turns the trigger 72 which moves the cam surface 73 away from the biting edge on the member 74, releasing the wire and permitting the block 60 to be moved rearwardly on the shaft 61 without disturbing the wire in the machine. A pin 77 secured to the side of the block 60 limits the rearward movement of the lever 69.

Wire cutting mechanism

Figure 8:
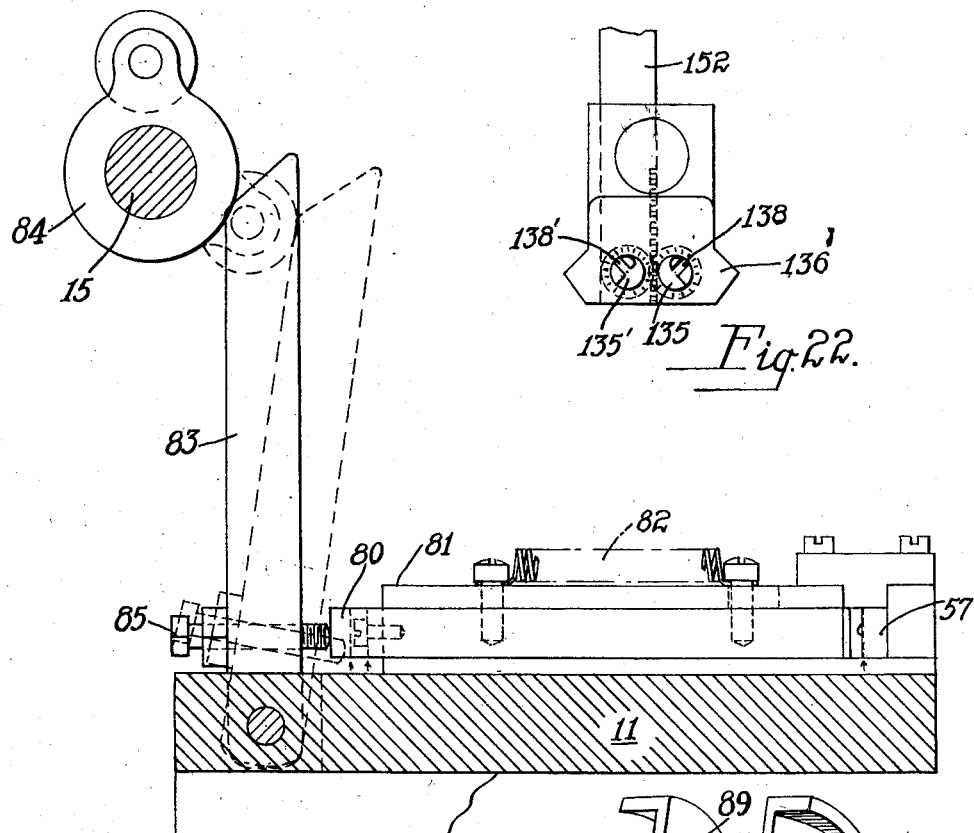
Fig. 8 is an enlarged side view partially in section of the wire cutting mechanism.

The wire as it is forced into the machine by the feeding mechanism passes through an opening drilled in the stationary cutter block 57 (Fig. 8) mounted on the shelf 11. A cutter bar 80 slidably mounted in a housing 81 which encloses the cutter block is periodically moved across the cutter block to sever the wire into suitable lengths for forming the fastener. The cutter bar is normally maintained in its inoperative position by a tension spring member 82 which is secured between the bar 80 and the housing 81. The cutter bar 80 is moved across the face of the cutter block by a lever 83 which is pivoted in a slot formed in the shelf 11. The lever 83 is disposed in the path of a roller cam 84 mounted on the cam shaft 15. The cam 84 forces the lever 83 into engagement with the end of the cutter bar 80 and moves the same, against the tension of the spring 82, across the face of the cutter block 57 to sever the wire. A set screw 85 extending through the lever 83 into engagement with the end of the cutter bar provides an adjustment for regulating the stroke of the cutter bar. The wire extends at an angle through the face of the cutter block so that the ends of the wire will be pointed by the severing operation.

Wire bending mechanism

The wire forced through the cutter block 57 by the wire pulling mechanism 56 is guided into the machine by grooved arms 58 which are mounted on each side of the stationary forming mandrel 32 and which direct the wire through the tag below the mandrel. The mandrel is so positioned that one end of the wire projects from the mandrel a greater distance than the other. The arms 58 (Figs. 1 and 14) are secured on the ends of shafts 87 which extend through openings in projections 88 formed on the shelf 11.

Secured to the opposite ends of the shafts 87 are arms 91 having rollers 90 thereon which are followers of cams 89 mounted on the shaft 15.

When the wire has been cut to length the cams 89 engage the rollers 90 on the arms 91 spreading them apart and turning the shafts 87 in opposite directions to each other. This turning of the shafts 87 raises the ends of the arms 58 and bends the ends of the wire upwardly around the mandrel, forming a U-shape (Fig. 10) piece, one leg of which is shorter than the other. A tension spring 92 disposed between the arms 91 causes the rollers 90 to follow the contour of the cams 89. The surfaces of the cams 89 are so shaped that the arms 58 hold the wire on the mandrel until the fastener is completely formed when the arms are returned to their initial position. The arms 58 are provided with notched ends which act as fingers and place the wire in position for the subsequent operations performed by the machine in forming the clip.

Figure 14:
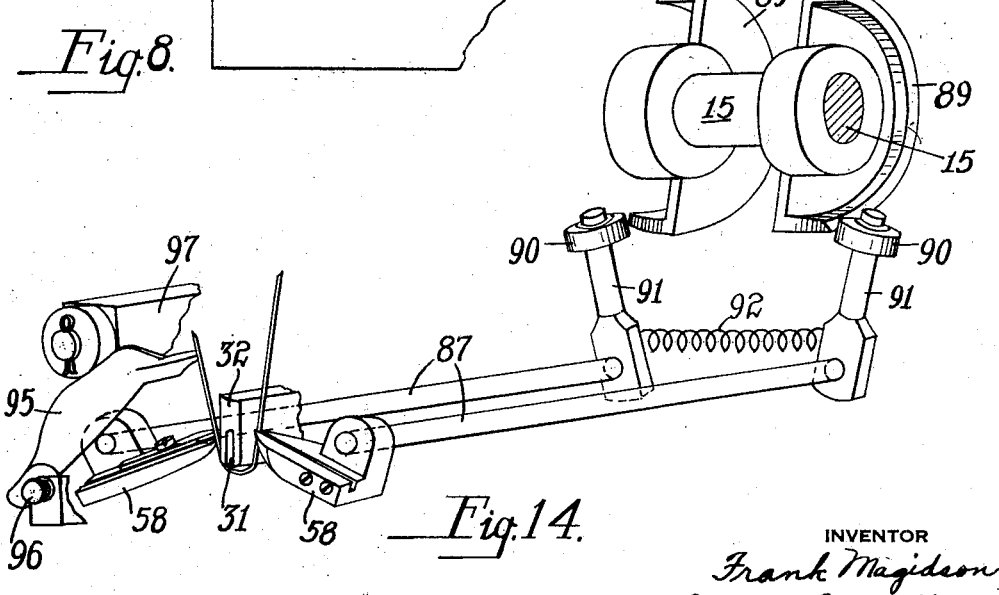
Fig. 14 is an enlarged detail view in perspective of the mechanism for guiding the wire into the machine and for bending the same into the shape shown in Figure 10, portions thereof being broken away for clearness of illustration.

After the wire has been bent into U-shape, the short leg of the wire is bent across the mandrel so that it intersects the other leg of the wire at an angle of 45°. The short leg of the wire is bent across the mandrel by a finger 95 pivotally mounted on a stub shaft 96 which is secured to the shelf 11 (Figs. 1, 14).

The finger 95 is forced into contact with the short leg of the wire by a crank arm 97 which is pivoted in a bracket 98 mounted on the shelf 11 (Fig. 15). One end of the crank arm 97 extends over the finger 95 and the other end carries a roller 100 which is periodically engaged by a cam 99 mounted on the cam shaft 15.

The cam 99 on engaging the roller 100 causes the crank arm 97 to turn around its pivot and force the finger 95 into contact with the short leg of the wire. The roller 100 is maintained in engagement with the cam by a spring member 101 disposed between the shelf 11 and the crank arm 97. A spring member 102 (Fig. 3) normally holds the finger 95 in its inoperative position.

Wire looping mechanism

After the short end of the wire has been bent across the long leg of the wire mechanism engages the long leg of the wire and bends it so that it extends across the short leg and intersects the same at an angle of 90°. The mechanism for bending the long leg of the wire comprises a plunger 105 (Figs. 1, 2 and 16) mounted on the end of a block 106 which is slidably mounted in a guideway 107 bolted to the upright 12. The plunger 105 is normally held out of engagement with the ends of the wire by tension springs 108 the ends of which are secured to the block 106 and guideway 107.

The block 106 has a slot 113 through which extends the end of a lever 111 pivotally mounted in a bracket 112 depending from the guideway 107. The end of the lever 111 projecting through the block 106 is secured to a rod 115 which is connected to a lug 114 extending upwardly from the block 106. The opposite end of the lever 111 has a roller 110 mounted thereon which acts as a follower for a cam 109 on the shaft 16 (Fig. 4).

It is readiy apparent from such a construction that, as the cam shaft 16 rotates, the cam 109 periodically engages the roller 110 and turns the lever 111 about its pivot point moving the block 106 in the guideway 107 and forcing the plunger 105 against the long leg of the wire. The plunger bends the wire over the mandrel 32 so that it intersects the short leg at an angle of 90°. The connecting rod 115 may be lengthened or shortened so that the plunger will bend the long leg of the wire into proper position. The plunger 105 has an opening 116 drilled therein, in which the short end of the wire is received as the plunger is forced downwardly against the long leg of the wire.

The long leg of the wire has been bent so that it intersects the short leg at substantially right angles. Mechanism is then operated which loops the long leg around the short end so as to form a guiding and retaining member for the fastener. To loop the end of the wire a rotatable sleeve or cylinder 120 is mounted on the end of the plunger 105. The sleeve has a finger 121 on the end thereof which engages the long leg of the wire. When the plunger has been moved downwardly, the sleeve is rotated, and the finger 121 bends the end of the wire around a pin 122 mounted on the end of the plunger looping it around the short leg of the wire. To rotate the sleeve 120 a pinion gear 123 is secured thereto which meshes with a segmental rack bar 124. The rack bar 124 is pivotally mounted in a bracket 125 which is secured to the plunger 105. (Figs. 1, 3, 4 and 16.)

The rack bar is actuated by a crank arm 128 pivoted to the upright member 12 and having one end extended over the end of the rack bar. The other end of the crank arm 128 has a roller 127 mounted thereon which follows a cam 126 secured to the shaft 16. As the shaft is rotated, the cam 126 turns the crank arm about its pivot point and moves the end of the crank arm against a projection 129 on the rack bar 124 which rotates the sleeve 120 through the pinion 123. After the loop has been formed, the block 106 is pulled back to its original position by the spring members 108 removing the plunger from engagement with the ends of the wires. A spring member 130 returns the sleeve and rack bar 124 to their original position as soon as the plunger has been withdrawn from the wire.

*Jaw forming mechanism*

After the long end of the wire has been looped about the short end, the wire is of the shape shown in Figure 12, with the ends above the loop extending at right angles to each other.

The mechanism for forming the jaws on the ends of the wires comprises two shafts 135 and 135′ journaled in a block 136 which is slidably mounted in a guideway 137 secured on the shelf 11 (Figs. 3, 18, 19 and 22). The ends of the shafts 135 and 135′ are notched, as at 138 and 138′, to receive the ends of the wire when the block is moved toward the mandrel 32. To move the block 136 forwardly, to position the ends of the wire in the notched ends of the shafts, a lever 141 is so positioned on the machine that one end engages the block 136 and the other end rests against a cam 140 on the shaft 15. The lever 141 is pivoted in a bracket 142 extending from the frame member 17 and has a roller 143 on the end engaging the cam 140 which forms a follower for the cam. A compression spring 144 returns the block 136 to its original inoperative position as soon as the jaws have been formed on the ends of the wire.

The forward movement of the block 136 may be adjusted by a set screw 145 which extends through the end of the lever 141 and engages the end of the block.

When the ends of the wire are received in the notches 138 and 138′ the shafts 135 and 135′ are turned in opposite directions one to the other and shape or form the article engaging jaws for the clip or fastener (Fig. 13).

To turn the jaw forming shafts in opposite directions, a pinion gear 150 is secured to the shaft 135 which meshes with a gear 151 secured to the end of the shaft 135′. The gear 150, is approximately twice as long as the gear 151 and also meshes with a vertically extending rack bar 152 mounted in the block 136. When the block 136 has been moved forward so as to position the ends of the wire in the notches 138 and 138′ the rack bar 152 is pressed downwardly and turns the shafts 135 and 135′ in opposite directions through the described gearing.

To operate the rack bar 152, I provide a lever 153 which is adapted to periodically strike the top of rack bar 152. This lever 153 is pivotally mounted on a stub shaft 154 secured to the upright 12 and is moved into and out of engagement with the top of the rack bar by a cam 155 mounted on the cam shaft 16. The shaft 154 has a roller 156 on the end thereof which is forced to follow the surface of the cam 155 by a tension spring 157, secured between the shaft 154 and the stationary upright 12. In order to control the shape of the jaws formed on the wire, the lever 153 has a set screw 158 extending therethrough, the end of the screw 158 forms the striking surface which hits the top of the rack bar. By threading the screw 158 in and out of the lever 153, the stroke of the rack bar may be lengthened and shortened respectively which increases and decreases the turning movement of the shafts (Fig. 18).

After the shafts 135 and 135′ have been turned to shape the jaws, the block 136 is returned to its original position, withdrawing the shafts from engagement with the wire. As soon as the shafts are out of engagement with the ends of the wire, the rack bar 152 is returned to its initial position by a spring member 159 mounted on the end of the shaft 135.

Discharge mechanism

As soon as the block 136 is moved to its inoperative position, the fastener or clip is grabbed by the discharge mechanism which pulls it off the mandrel 32 and deposits it in a suitable receptacle.

The discharge mechanism (Figs. 18, 23 and 24) comprises fastener engaging plier arms 160 which are pivoted on the lower end of a lever 161. The lever 161 is pivoted to an arm 162 which is secured to the frame member 17. The upper end of the lever 161 is pivoted to a link 163 which connects it to the end of a lever 164 pivoted to the upright 12. The opposite end of the lever 164 has a roller 165 secured thereto which follows a cam 166 mounted on the cam shaft 15. From the construction described, it is readily seen that the lever 161 is oscillated by the cam 166 which carries plier arms 160 toward the mandrel so as to grab the fastener when swinging in one direction and away from the mandrel when swinging in the opposite direction to discharge the fastener from the plier arms.

Spring members 170 positioned between the plier arms 160 and the lever 161 tend to force the arms together so as to securely hold the fastener therebetween. The arms are spread apart to discharge the fastener when the lever swings away from the mandrel by a rod 171 which is pivoted at 172 to the arm 162 and which extends downwardly between the plier arms 160. The pivot point 172 of the rod is closer to the frame 17 than the pivot point of the lever 161 so that, as the lever 161 swings outwardly from the mandrel the lower end of the rod 171 will move relative to the lower end of the lever 161. The lower end of the rod 171 is provided with notched out portions 173 (Fig. 23) which receive the plier arms 160 when the discharge mechanism is in position to grab the fastener. The notches permit the springs 170 to close the arms over the fastener. As the discharge mechanism is swung away from the mandrel 32, the movement of the rod 171, relatively to the lever 161, causes the notched portions 173 to be moved from position between the arms which forces the plier arms to spread apart and discharge the fastener. A spring member 175 disposed between the lever 161 and the arm 162 forces the roller 165 to follow the contour of the cam 166.

Operation

In starting up the machine, the end of the wire from the coil is fed through the straightening rolls 55 by the operator and directed through the wire puller 56 and the drilled cutter block 57. The tags, which are to have the fasteners formed thereon, are placed in the holder 25. The cam 45 on the shaft 15 then operates the lever 47 which swings the end 36 of the suction arm 30 upwardly and positions a tag in the groove 31 of the forming mandrel 32. As the tag is positioned in the forming mandrel, the cam 62 which operates in timed relation to the cam 45, actuates the wire puller 56 which forces a length of wire through the cutter block onto the guide arms 58 which direct the wire through the tag below the mandrel 32. When the proper length of wire has been fed into the machine for forming the fastener, the cam 84 strikes the lever 83 which forces the cutter bar 80 to move across the face of the cutter block 57 and sever the wire on an angle so that the ends thereof will be pointed. As soon as the wire has been severed the wire puller 56 and the suction arm 30 are returned to their original positions. The cams 89 then turn the shafts 87 in opposite directions which elevate the ends of the guide arms 58 secured thereto and bend the ends of the wire upwardly around the mandrel 32 forming a U-shaped member having one leg shorter than the other. The cam 99 then operates the finger 95 which bends the short leg of the wire over the mandrel so that it intersects the long leg of the wire at an angle of 45° in position to be received in the opening 116 in the plunger 105 which is forced downwardly by the cam 109. The plunger is forced against the long end of the wire and bends it over the mandrel so that it intersects the short leg of the wire at an angle of 90°.

While the plunger is still in engagement with the long end of the wire, the cam 126 actuates the lever 128 which strikes the rack bar 124, turning the sleeve 120. The turning of the sleeve bends the long end of the wire around the pin 122 on the plunger 105 forming a loop around the short end thereof. The plunger 105 and the looping mechanism carried thereby are then returned to their inoperative positions. After the loop has been formed on the wire, the cam 140 forces the block 136 forwardly so that the ends of the wire are received in the notched ends 138 and 138' of the shafts 135 and 135'. While the ends of the wire are positioned in the notches 138 and 138', the cam 145 swings the lever 153 about its pivot point, forcing it to strike on the top of the rack bar 152 which rotates the shafts 135 and 135' in opposite directions so that the wires in notches 138 and 138' are bent toward each other to form the jaws of the fastener. The block 136, the finger 95, and the guide arms 58 are then returned to their inoperative positions leaving the clip and tag hanging loosely on the mandrel. As soon as the guide arms have been returned to their initial position, the cam 166 swings the arm 161 toward the mandrel 32 and positions the plier arms 160 over the fastener. The cam 166 then swings the arm 161 away from the mandrel. As the arm moves outwardly the plier arms are spread by the rod 171 which permits the tag fastener to drop into a receiving receptacle. When the tag has been discharged from the mandrel the suction arm 30 feeds another tag to the mandrel and the wire puller 56 forces another length of wire into the machine and a new cycle of operation is started.

What I claim as new and desire to secure by Letters Patent is:

1. A machine for bending a length of wire having a tag threaded thereon into a fastener comprising a mandrel, means for bending the wire around the mandrel to form straight, parallel legs, the ends of which cross one another above the mandrel, means for bending one end of the wire around the other end to form a closed guiding and retaining loop, and means for bending the end of the wire above said loop toward each other to form article engaging jaws on said fastener.

2. In a machine for forming fastener clips, the combination comprising means for bending a piece of wire into U-shape one leg of which is longer than the other, means for bending the legs of the wire across each other, means for loosely looping the long leg of the wire about the other leg so that the short leg is movable within the confines of the loop, and means for bending the end of each leg above the loop back upon itself to form jaws for the clip.

3. A machine for forming a fastener from a piece of wire having a tag positioned thereon comprising means for bending the wire upon itself to provide legs spaced apart throughout a portion of their length, means for bending the ends of the wire so as to intersect each other, means for bending one end of the wire around the other end to form a closed, relatively flat guiding and retaining loop, and means for bending the ends of the wire above the loop toward each other to form article engaging jaws on said wire.

4. A machine for forming wire fastening clips on tags, comprising a mandrel, mechanism for positioning a length of wire underneath said mandrel so that one end extends a greater distance from one side of the mandrel than the other, mechanism for bending the ends of said wire upwardly around said mandrel, mechanism for bending the short end of the wire over the top of said mandrel, mechanism for looping the long end of the wire around the short bent end, mechanism for bending the ends of said wire above the loop toward each other for forming article engaging jaws thereon, and means for operating each of the said mechanisms in timed relation to each other.

5. In a machine for automatically forming pin fasteners on tags, the combination comprising a forming mandrel, mechanism for threading a wire through a tag held underneath said forming mandrel, mechanism for angularly cutting the wire to length and pointing the ends thereof, mechanism for bending the ends of said wire upwardly around said forming mandrel, mechanism for bending one end of said wire over the top of said forming mandrel so that the same extends across the other end of the wire, mechanism for looping the straight end of the wire around the bent end, mechanism for bending the ends of said wire into contact with each other so as to form article engaging jaws on the wire, and means for operating each of the aforementioned mechanisms in timed relation to each other.

6. A machine for automatically forming pin fasteners from a length of wire having a tag threaded thereon comprising a forming mandrel, guide arms one each side of said mandrel, means for positioning a length of wire on said guide arms so that one end extends a greater distance beyond said mandrel than the other end, means for actuating said guide arms to bend the ends of said wire upwardly around said mandrel, means for bending the short end of the wire over the top of the mandrel, means for bending the long straight end of the wire around the short end to form a closed guiding and retaining loop, means for bending the ends of said wire above the loop into contact with each other so as to form article engaging jaws on said wire, and driven shafts having a series of cams therein for operating each of the aforementioned means.

7. A machine for automatically forming wire fasteners on tags, comprising a forming mandrel, a wire feeding member, means for actuating said wire feeding member to thread a wire through a tag positioned underneath said forming mandrel, a wire cutter, means for operating said cutter to cut said wire to length, means for bending the ends of said wire upwardly around said forming mandrel, means for bending one end of said wire over the top of said tag receiving member so that it extends across the other end thereof, means for looping the straight end of the wire around the bent end, means for bending the ends of the wire above said loop into contact with each other so as to form article engaging jaws on said wire, and means for operating each of the aforementioned means in timed relation to each other.

8. In a machine for automatically forming pin fasteners on tags, the combination comprising a forming mandrel, a sliding wire feeding member, means for sliding said wire feeding member to and fro for threading a wire through a tag positioned underneath said forming mandrel, wire guiding members, a wire cutter, means for operating said cutter, means for raising the ends of said wire guiding members to bend the ends of said wire upwardly around the forming mandrel, means for bending one end of said wire across the other end of the wire, means for looping the straight end of the wire around the bent end, means for bending the ends of said wire into contact with each other so as to form article engaging jaws on said wire.

9. A machine for automatically forming wire pin fasteners on tags, comprising means for feeding a piece of wire into said machine and threading it through a tag, positioned therein, means for cutting the wire to length, means for bending the length of wire into U-shape, means for bending one leg of the U-shaped wire across the other leg, a wire looping member having an opening therein, and wire engaging fingers projecting therefrom, means for moving said wire looping member into engagement with the legs of said wire, said bent end being received in said opening while the other leg is received between the wire engaging fingers, means for turning said wire looping member for looping the straight leg of said wire about the bent leg thereof, and means for bending the ends of said wire above said loop into contact with each other so as to form article engaging jaws on said wire.

10. A machine for automatically forming wire pin fasteners on tags comprising mechanism for positioning a tag in said machine, mechanism for feeding a length of wire into said machine and threading it through said tag, mechanism for bending the wire upon itself to provide spaced upstanding legs, mechanism for bending one leg of the wire so that the same extends obliquely across the other leg, mechanism for looping the other leg of the wire around the bent leg, mechanism for bending the ends of the wire beyond the loop into contact with each other so as to form article engaging jaws, and mechanism for discharging said fastener and tag from said machine.

11. In an automatic machine, mechanism for feeding wire from a coil to said machine, including a block slidably mounted on the frame of said machine, a trigger on said block having a portion adjacent said wire, means for turning said trigger so as to cause a portion thereof to engage and hold said wire when the block is sliding in one direction, and to disengage said wire when moving in the opposite direction, and means for sliding said block to and fro on said frame.

12. The combination in an automatic machine comprising a mandrel, mechanism for feeding wire into the machine, means for guiding said wire into the machine below the mandrel, means for cutting said wire to length, means for elevating said guiding means for bending the ends of the wire upwardly around said mandrel, mechanism for bending one end of the wire over said mandrel, mechanism for looping the opposite end of said wire around the end bent over the mandrel, and mechanism for forming jaws on the ends of the wire.

13. The combination in an automatic machine comprising a mandrel, mechanism for feeding wire into the machine below said mandrel, means for cutting said wire to length, mechanism for bending the ends of the wire upwardly against said mandrel, mechanism for bending one end of the wire over said mandrel, and mechanism for looping the other end of said wire around the end bent over the mandrel, including a member slidably mounted in said machine, a plunger carried by said member and having an opening on the end thereof adapted to receive the bent end of said wire, means mounted on said plunger engaging the straight end of said wire, and means for actuating said last mentioned means for looping one end of the wire about the other.

14. The combination in an automatic machine comprising a mandrel, mechanism for feeding wire into the machine below said mandrel, means for cutting said wire to length, mechanism for bending the ends of the wire upwardly against said mandrel, mechanism for bending one end of the wire over said mandrel, and mechanism for looping the other end of said wire around the end bent over the mandrel, including a slidable member, a plunger carried by said slidable member having an opening in the end thereof adapted to receive the bent end of said wire, a sleeve mounted on the end of said plunger having projections thereon adapted to engage the straight end of said wire, cam operated means for sliding said member forward so that the bent end of said wire is received in the opening in said plunger and the projections are in engagement with the straight end of said wire, and cam operated means for turning said plunger when the sliding member is in its forward position so as to loop one end of the wire about the other.

15. The combination in an automatic machine comprising a mandrel, mechanism for feeding wire thereto below said mandrel, mechanism for cutting the wire to length, mechanism for bending the ends of the wire upwardly around the mandrel, mechanism for bending one end of the wire over the mandrel, mechanism for looping the straight end of the wire around the bent end, and mechanism for bending the ends of the wire above said loop into contact with each other so as to form jaws thereon, said mechanism including a pair of fingers, means for moving said fingers into engagement with the ends of the wire, and means for turning said fingers when in engagement with the ends of said wire.

16. The combination in an automatic machine comprising a mandrel, mechanism for feeding wire into said machine below said mandrel, mechanism for cutting the wire to length, mechanism for bending the ends of the wire upwardly around said mandrel, mechanism for bending one end of the wire over the mandrel, mechanism for looping the straight end of the wire around the bent end, and mechanism for bending the ends of the wire above said loop into contact with each other so as to form jaws thereon, said mechanism including a slidable member, a pair of shafts rotatably mounted therein, means for moving said member and shafts to and fro into and out of engagement with the ends of said wire, and means for rotating said shafts when the same are in engagement with the ends of said wire.

17. The combination in an automatic machine comprising a mandrel, mechanism for feeding a length of wire into said machine below said mandrel, mechanism for bending the ends of the wire upwardly around the mandrel, mechanism for bending one end of the wire over the mandrel, mechanism for looping the straight end of the wire around the bent end, and mechanism for bending the ends of the wire above said loop into contact with each other so as to form a loop, said mechanism including a slidable member, a pair of shafts having wire receiving fingers on the ends thereof rotatably mounted in said member, cam operated means for moving said member forwardly so as to bring said fingers into engagement with the ends of said wire, and cam operated means for rotating said fingers when the same are in engagement with the ends of the wire.

18. The combination in an automatic machine comprising a mandrel, mechanism for feeding wire thereto below said mandrel, mechanism for cutting the wire to length, mechanism for bending the ends of the wire upwardly around the mandrel, mechanism for bending one end of the wire over the mandrel, mechanism for looping the straight end of the wire around the bent end and mechanism for bending the ends of the wire above said loop into contact with each other so as to form a clip, and mechanism for discharging the wire clip from said mandrel, including a swinging arm having clip engaging members on the end thereof, and means for spreading said clip engaging members when the same is swung outwardly.

19. The combination in an automatic machine comprising a forming mandrel, mechanism for feeding wire into said machine below said mandrel, mechanism for cutting the wire to length, mechanism for bending the ends of the wire upwardly around the mandrel, mechanism for bending one end of the wire over the mandrel, mechanism for bending and looping the other end of the wire around the bent end, mechanism for bending the ends of the wire above said loop into contact with each other so as to form jaws on said wire, and mechanism for discharging the wire clip from said mandrel, including a swinging arm, plier members on the end of said arm adapted to engage said clip when the arm is swung toward the mandrel, means for swinging said arm away from said mandrel, and means associated with said arm for expanding said plier members when the arm is swung away from said mandrel.

20. The combination of an automatic machine comprising a forming mandrel, rotatable shafts on each side of said mandrel, grooved arms on the ends of said shafts, means for forcing a wire through the grooves in said arms, means for rotating said shafts in opposite directions so as to raise the ends of said arms and bend the end of said wire upwardly around said mandrel, a cam operated member for bending one end of the wire over said mandrel, mechanism for receiving the bent end of the wire and for looping the straight end therearound, mechanism for bending the ends of the wire above the loop into contact with each other so as to form said wire into a clip, and means for discharging said clip from said mandrel.

21. An automatic machine for forming wire fasteners on tags comprising a mandrel having a tag receiving groove therein, a block having wire engaging means thereon, cam operated mechanism for sliding said block to and fro for threading a wire through a tag positioned underneath said mandrel, a cam actuated cutter-bar for cutting the threaded wire to length, cam actuated members for bending the wire upwardly against said mandrel, a cam actuated member for bending one end of the wire over said mandrel so that the same extends obliquely across the other end of said wire, a member having an opening therein adapted to receive the bent end of said wire, a sleeve on said member having fingers for engaging the straight end of said wire, cam actuated means for turning said sleeve to cause said fingers to loop the straight end of the wire around the bent end, a slidable body having shafts mounted therein provided with slotted ends adapted to engage the ends of said wire above the loop, cam actuated means for turning said shafts to form jaws on the ends of said wire, and cam actuated mechanism for discharging said tag and clip from said machine.

22. A machine for forming a pin ticket from a length of wire, comprising means for bending the wire upon itself to provide spaced legs one of which is longer than the other, means for bending said legs intermediate of their length so that the ends thereof intersect each other, means for twisting the long leg around the short leg to form a guiding and retaining loop, and means for bending the ends of the legs above said loop into contact with each other to form article engaging jaws.

23. A machine for automatically forming successive clips from a coil of wire, comprising means for feeding the end of said coil of wire into said machine, means for severing said wire to length, means for bending said length of wire upon itself to provide spaced legs, means for bending the legs of said wire intermediate of their length to cause the ends thereof to intersect, means for twisting one leg of the wire around the other to form a closed, relatively flat guiding and retaining loop, and means for bending the ends of the wire above the loop into contact with each other to form article engaging jaws.

24. A machine for forming successive wire clips comprising means for feeding wire into said machine, means for cutting said wire to length, means for bending said wire upon itself to provide spaced legs one of which is longer than the other, means for bending the legs intermediate of their length so that the ends thereof intersect each other, means for twisting the bent end of the longer leg around the shorter leg to form a closed, relatively flat guiding and retaining loop therefor, means for bending the ends of the wire above the loop into contact with each other to form article engaging jaws on said wire, and means for withdrawing the clip from the machine.

25. A machine for forming wire fasteners on tags of the type having an eye therein, comprising means for feeding wire into said machine, means for delivering a tag to said machine and positioning the eye thereof in the path of the oncoming wire so that it is threaded therethrough, means for cutting the wire to length, means for bending the wire upon itself to form spaced legs one of which is longer than the other, means for bending said legs so that the ends thereof intersect each other, means for twisting the bent end of the long leg around the short leg to form a relatively flat guiding and retaining loop therefor, and means for bending the ends of the wire above the loop into contact with each other to form article engaging jaws.

26. An automatic machine for forming wire fasteners on tags of the type having an eye therein comprising means for feeding a length of wire into said machine, means for delivering a tag into said machine and positioning the eye thereof in the path of the oncoming wire so that it is threaded therethrough, means for bending the length of wire upon itself to form spaced legs one of which is longer than the other, means for bending said legs intermediate of their length so that the ends thereof intersect, means for twisting the bent end of the long leg around the short leg to form a closed, relatively flat guiding and retaining loop, and means for bending the ends of the legs above said loop into contact with each other to form article engaging jaws.

In testimony whereof, I have hereunto subscribed my name this 9th day of October, 1931.

FRANK MAGIDSON.